United States Patent
Kurokawa

(10) Patent No.: US 8,097,314 B2
(45) Date of Patent: Jan. 17, 2012

(54) FLUORORESIN TUBE AND PROCESS FOR PRODUCING THE SAME

(75) Inventor: Masaki Kurokawa, Konan (JP)

(73) Assignee: Gunze Limited, Kyoto (JP)

(*) Notice: Subject to any disclaimer, the term of this patent is extended or adjusted under 35 U.S.C. 154(b) by 232 days.

(21) Appl. No.: 12/596,927

(22) PCT Filed: May 9, 2008

(86) PCT No.: PCT/JP2008/058674
§ 371 (c)(1),
(2), (4) Date: Oct. 21, 2009

(87) PCT Pub. No.: WO2008/143035
PCT Pub. Date: Nov. 27, 2008

(65) Prior Publication Data
US 2010/0119754 A1 May 13, 2010

(30) Foreign Application Priority Data

May 10, 2007 (JP) .................................. 2007-125755

(51) Int. Cl.
 B29D 23/00 (2006.01)
 B32B 1/08 (2006.01)
(52) U.S. Cl. ............... 428/35.2; 428/35.5; 428/36.9; 428/421; 428/422; 264/209.1; 264/209.3; 264/209.4; 264/209.8
(58) Field of Classification Search ............... 428/35.2, 428/35.5, 36.9, 421, 422; 264/209.1, 209.3–209.5, 264/209.8, 176.1, 177.17
See application file for complete search history.

(56) References Cited

U.S. PATENT DOCUMENTS

| | | | |
|---|---|---|---|
| 5,411,779 A * | 5/1995 | Nakajima et al. | 428/36.91 |
| 6,217,963 B1 * | 4/2001 | Miyamoto et al. | 428/36.91 |
| 7,488,528 B2 * | 2/2009 | Iwamoto | 428/141 |
| 7,651,749 B2 * | 1/2010 | Nanbu et al. | 428/36.9 |
| 2004/0229043 A1 * | 11/2004 | Spohn et al. | 428/421 |
| 2005/0064122 A1 * | 3/2005 | Oyama et al. | 428/36.9 |
| 2006/0083885 A1 * | 4/2006 | Yoshida et al. | 428/36.91 |

FOREIGN PATENT DOCUMENTS

| | | |
|---|---|---|
| JP | 5-200904 | 8/1993 |
| JP | 5-229077 | 9/1993 |

(Continued)

OTHER PUBLICATIONS

"Extrusion" Chap. 8 Ebnesajjad, S. (2003). Fluoroplastics, vol. 2—Melt Processible Fluoropolymers. William Andrew Publishing/Plastics Design Library.*

(Continued)

*Primary Examiner* — Michele L Jacobson
(74) *Attorney, Agent, or Firm* — Wenderoth, Lind & Ponack, L.L.P.

(57) ABSTRACT

The present invention provides a large diameter thin-walled fluororesin tube, which has, even with a large diameter (for example, ø 100 mm or more), excellent wall thickness precision and a low degree of stable orientation; and a process for producing the same. Specifically, the present invention relates to a fluororesin tube having an average thickness of 70 μm or less and an outer diameter of 100 mm or more, wherein variation in the tube thickness is within ±20% with respect to the average tube thickness and a degree of orientation (F) is within a range of 0.25 to 0.55.

10 Claims, 1 Drawing Sheet

FOREIGN PATENT DOCUMENTS

| | | | |
|---|---|---|---|
| JP | 6-143389 | | 5/1994 |
| JP | 7-33624 | | 6/1995 |
| JP | 2002-295450 | * | 10/2002 |
| JP | 2003-145608 | * | 5/2003 |
| JP | 2007-130803 | | 5/2007 |

OTHER PUBLICATIONS

"Novel PVDF Multilayer Blown Films" Bussi, P., MBS-Specialty Plastic Films 2001, Dusseldorf.*

Machine translation of JP2003-145608.*

International Search Report issued Aug. 12, 2008 in International (PCT) Application No. PCT/JP2008/058674.

Japanese Office Action (along with English translation) issued Jul. 22, 2009 in Japanese Patent Application No. 2009-515155.

International Preliminary Report on Patentability issued Nov. 24, 2009 in International (PCT) Application No. PCT/JP2008/058674.

* cited by examiner

FLUORORESIN TUBE AND PROCESS FOR PRODUCING THE SAME

TECHNICAL FIELD

The present invention relates to a fluororesin tube, particularly to a fluororesin tube used as a surface release layer of a belt for an image forming apparatus employing an electrophotographic system, such as copiers, printers, facsimiles, and the like.

Specifically, the present invention relates to a fluororesin tube usable as a release layer of a belt for electronic photographing. Examples of such release layers include a surface layer of a developing sleeve of a developing unit, which develops toner on an electrostatic latent image formed on a photoconductor; a surface layer of an intermediate transfer belt used for transferring the developed toner image onto a recording material such as a paper etc.; a surface layer of a fixing belt, which fixes the transferred toner image on the recording material; a surface layer of a transfer-fixing belt used for both the transferring and the fixing; and the like.

BACKGROUND ART

Fluororesin tubes are excellent in electric insulation, thermal resistance, releasability, etc., and are thus usable as a surface release layer of a belt used for an image forming apparatus employing an electrophotographic system. Such belt surface release layers are required to be high quality with a thin wall and without variations in wall thickness and diameter.

Heretofore, fluororesin tubes have been produced by melting fluororesin and extruding the molten fluororesin through a die. The extrusion is conducted using either internal- or external-circumference regulating means so that the produced fluororesin tube can maintain its perfect round shape (Patent Literatures 1, 2, etc.).

Recently, there has been a demand for further improved image quality, which requires a sufficiently wide nip width. Therefore, progress towards increasing the diameter of the fixing belt has been made in order to meet this requirement.

With regard to conventional thin-walled fluororesin tubes having a diameter as small as less than ø 100 mm, the extruded tube-shaped resin can retain its stiffness by itself; therefore, a tube with a perfect round shape can be obtained, while achieving sufficient thickness precision. Regarding a tube having a diameter as large as ø 100 mm or more, the thickness of the extruded tube-shaped resin is insufficient for its diameter, resulting in a lack of stiffness causing deflection under the force of gravity. This renders the produced tube incapable of retaining uniform properties and wall thickness, leading to large variations in its properties and thickness in the circumferential direction of the tube. For this reason, producing a thin-walled tube with a large diameter, which can satisfy the market demand, has been difficult.

Additionally, when a fluororesin tube has a high degree of orientation, defects such as cracking or tearing easily occur on its surface during the formation or actual use of a roller or a belt. When a fluororesin tube has a diameter as large as ø 100 mm or more, the degree of orientation varies and tends to increase. Accordingly, improvement therefor needs to be made.

[Citation List]

[Patent Literature]

[PTL 1] Japanese Unexamined Patent Publication No. 6-143389

[PTL 2] Japanese Unexamined Utility Model Publication No. 7-033624

SUMMARY OF INVENTION

Technical Problem

It is an object of the present invention to provide a large diameter thin-walled fluororesin tube, which has excellent wall thickness precision and a low degree of stable orientation even with a large diameter (for example, ø 100 mm or more); and a process for producing the same.

Solution to Problem

The present inventor found that when the average thickness of a fluororesin tube is insufficient compared to the average outer diameter thereof, e.g., when the average outer diameter of the tube is extremely large compared to the average thickness thereof, a fluororesin tube will have insufficient stiffness and undergo a deflection under the force of gravity due to its production process. This results in low wall thickness precision and an increase in the degree of orientation of the resin. In particular, when a large diameter tube has an average outer diameter of ø 100 mm or more, the wall thickness precision in the circumferential direction is significantly deteriorated, and the degree of orientation of the resin will be further increased. Therefore, in view of the above, the inventor sought a process for producing a large diameter fluororesin tube with excellent wall thickness precision and a low degree of orientation.

The inventor conducted extensive research to solve the above problems and found the following. That is, a fluororesin tube having a uniform thickness can be produced by bringing, at the exit of a fluororesin melting extruder, the outer and inner surfaces of a melt extruded cylindrical fluororesin tube separately into contact with outer and inner diameter-regulating jigs while blowing air inside the tube so as to apply an internal pressure thereto. With the method above, even a large diameter tube having an average outer diameter as large as ø 100 mm or more can maintain its cylindrical shape, without undergoing deflection.

The inventor further found that the tube shape can be maintained by providing an air introducing pipe (an air pipe) with a jig that regulates an inner surface of a fluororesin tube, and applying an appropriate internal pressure from the air introducing pipe to inside the tube, thereby regulating the outer surface of the tube by the air pressure applied from the pipe.

Further, the inventor found the following: a cylindrical protector can be provided with a metal mold for enclosing the outer periphery of the fluororesin tube from where the fluororesin tube is melt extruded to where the tube is brought into contact with the inner diameter-regulating jig; thereby, temperature reduction and temperature irregularities of the tube in a molten state caused by the external air currents can further be minimized; the position at which the tube contacts the inner diameter-regulating jig can be constantly controlled; and the disturbance in orientation of the resin can be prevented. Accordingly, with the provision of a cylindrical protector as above, a fluororesin tube having excellent wall thickness precision and a low degree of orientation can be produced.

Based on the above findings, the inventor conducted further research and completed the present invention.

Specifically, the present invention provides a fluororesin tube and a preparation process thereof as summarized below.

1. A fluororesin tube having an average thickness of 70 μm or less and an outer diameter of 100 mm or more, wherein variation in the tube thickness is within ±20% of the average tube thickness, and a degree of orientation (F) is within a range of 0.25 to 0.55.

2. The fluororesin tube according to Item 1, wherein the fluororesin is at least one member selected from the group consisting of PFA, FEP, ETFE and a mixture thereof.

3. The fluororesin tube according to Item 1 or 2, having no folds.

4. A process for producing a fluororesin tube, comprising:
subjecting a fluororesin to melt extrusion to produce a tube-shaped fluororesin; and
bringing both outer and inner surfaces of the tube-shaped fluororesin separately into contact with outer and inner diameter-regulating jigs while applying an internal pressure to inside the tube-shaped fluororesin, so as to maintain its tube shape.

5. The process for producing a fluororesin tube according to Item 4,
wherein the inner surface of the tube-shaped fluororesin is brought into contact with the inner diameter-regulating jig, and subsequently the outer surface of the tube-shaped fluororesin is brought into contact with the outer diameter-regulating jig.

6. The process for producing a fluororesin tube according to Item 5,
wherein a cylindrical protector provided with a metal mold encloses the outer periphery of the tube-shaped fluororesin to an area where the tube-shaped fluororesin is brought into contact with the inner diameter-regulating jig.

7. A surface release layer of a belt for an image forming apparatus employing an electrophotographic system, comprising a fluororesin tube of any of Items 1 to 3.

Hereunder, the present invention is described in detail.

Fluororesin Tube

The fluororesin tube according to the present invention is a thin-walled fluororesin tube with a large diameter. The fluororesin tube has a feature such that the average thickness is 70 μm or less and the outer diameter is 100 mm or more, wherein the variation in the tube thicknesses is within ±20% with respect to the average tube thickness and the degree of orientation (F) is within a range of 0.25 to 0.55.

Examples of fluororesins usable for forming the fluororesin tube of the present invention include polytetrafluoroethylene (PTFE), tetrafluoroethyleneperfluoroalkyl vinyl ether copolymer (PFA), tetrafluoroethylenehexafluoropropylene copolymer (FEP), tetrafluoroethyleneperfluoromethyl vinyl ether copolymer (MFA), tetrafluoroethyleneperfluoroethyl vinyl ether copolymer (EFA), polyethylenetetrafluoroethylene (ETFE), polyvinylidene fluoride (PVDF), polychlorotrifluoroethylene (PCTFE), polyvinylfluoride (PVF), and the like. Of these, particularly in terms of heat resistance, mechanical properties, etc., PFA, FEP, ETFE, and a mixture thereof are preferable.

Fluororesins may contain fillers. Usable fillers are not limited as long as they are suitable for melt extrusion.

Examples of such fillers include barium sulfate, synthetic mica, graphite, carbon black, and the like.

The fluororesin tube of the present invention has an average thickness of 70 μm or less, preferably 30 to 60 μm, and more preferably 30 to 50 μm. The "average thickness of a tube" used herein refers to an average of thicknesses measured at 80 measurement points in total, in which 10 measurement points are determined at equal intervals along the central axis direction of the tube, and based on the 10 points, 8 measurement points each are respectively determined at equal intervals along the circumferential direction.

The fluororesin tube of the present invention has an outer diameter of 100 mm or more, preferably 100 to 200 mm, and more preferably 100 to 180 mm. The "outer diameter of a tube" used herein refers to the outer diameter of a tube with a perfect round shape. Specifically, the outer diameter is calculated by measuring the width of the tube folded in halves (folded width), multiplying the measured width by 2, and then dividing it by π.

The fluororesin tube of the present invention has a thickness variation within ±20% of the average thickness. Specifically, thicknesses measured at 80 points in total all fall within ±20% of the average thickness, in which 10 points are determined at equal intervals along the central axis direction of a tube that was cut to a specified length of 600 mm, and based on the 10 points, 8 points each are respectively determined at equal intervals along the circumferential direction (see FIG. 3). That is, if the average thickness is 100%, the thicknesses measured at each of the 80 points all fall within the range of 80 to 120%. The variation in thickness is preferably within ±15% or less, and more preferably within ±10% or less with respect to the average thickness.

The degree of orientation (F) of the fluororesin tube of the present invention is 0.25 to 0.55, preferably 0.30 to 0.50, and more preferably 0.35 to 0.45. In connection with the degree of orientation, four points with respect to a tube that was cut to a specified length of 600 mm, are determined at equal intervals along the circumferential direction from a point arbitrarily determined in the central axis direction; at the four points, the diffraction intensity distribution for azimuthal angles of fluororesin crystal peak are measured. The average of the measured values is expressed as the degree of orientation. The degree of orientation is calculated using the following formula.

$$F=(180-\alpha)/180$$

wherein α is a half width of the orientation peak.

Production Process of Fluororesin Tube

The fluororesin tube of the present invention is produced by melt extruding a fluororesin, and bringing both outer and inner surfaces of the extruded tube-shaped fluororesin separately into contact with outer and inner diameter-regulating jigs while applying an internal pressure to the inside of the tube-shaped fluororesin, so as to retain the tube shape of the fluororesin. Accordingly, as explained above, the fluororesin tube has, even with a large diameter, excellent wall thickness precision and a low degree of orientation.

Specifically, the aforementioned fluororesin is supplied into an extruder hopper, and is then subjected to melt extrusion through a circular die. The outer and inner surfaces of the extruded tube-shaped resin are respectively brought into contact with two types of jigs, each of which regulates a diameter. Thereby, wall thickness precision can be improved. The materials of the diameter-regulating jigs may be, for example, a metal, such as brass. An optional process may be performed on the jig surfaces that contact with the tube-shaped resin. Inside the two diameter-regulating jigs, a cooling water flows (circulates) so as to rapidly cool the extruded tube-shaped molten resin through contact therewith. In the above manner, the diameter of the tube can be determined. The temperatures of the jigs are usually maintained at about 10° C. to about 90° C.

The diameter-regulating jig (the inner diameter-regulating jig), which contacts the inner surface of the tube-shaped resin, has a cylindrical shape. A tube-shaped resin is brought into contact with the outer surface of the diameter-regulating jig so as to be cooled rapidly. The jig is, for example, fixed to a metal mold via a support bar. The support bar of the jig has a pipe hole in the middle, through which air can be passed or introduced.

The diameter-regulating jig (the outer diameter-regulating jig), which contacts the outer surface of the tube shape resin, has a ring shape. The tube-shaped resin is brought into contact with the inner surface of the ring so as to be rapidly cooled.

The production process of the present invention has a feature of using the aforementioned two diameter-regulating jigs. The order of using the jig that regulates the inner surface of a tube and the jig that regulates the outer surface of a tube is not critical. In other words, the inner surface of a tube-shaped fluororesin may first be brought into contact with the inner diameter-regulating jigs, and subsequently, the outer surface thereof may be brought into contact with the outer diameter-regulating jig. Alternatively, the outer surface of a tube-shaped fluororesin may first be brought into contact with the outer diameter-regulating jig, and subsequently, the inner surface thereof may be brought into contact with the inner diameter-regulating jig. The former is preferred.

An example, in which a tube-shaped fluororesin that is formed by melt extrusion through a circular die is first brought into contact with an inner diameter-regulating jig and subsequently brought into contact with an outer diameter-regulating jig, will be described below with reference to FIG. 2.

A tube-shaped fluororesin melt extruded through a circular die is brought into contact with an inner diameter-regulating jig. Thereby, the molten tube shape can be maintained properly, while achieving a small degree of resin orientation. In the procedure above, it is preferable to provide, with a metal mold, a cylindrical protector (an orientation control cover) that encloses the outer periphery of the molten tube to an area where the tube is brought into contact with the inner diameter-regulating jig. This is because such a protector can prevent disturbances, such as airstreams flowing through the tube, etc., and can retain the heat of the tube in a molten state. The materials usable for a cylindrical protector are not limited as long as the cylindrical protector can be fixed to a metal mold and can block external air currents. Examples of materials include stainless steel, aluminum, and the like.

The inside of the outer diameter-regulating jig described below is slightly in a pressurized state due to the air introduced through air pipe 1. Therefore, it is preferable to provide air pipe 2, which penetrates the inner diameter-regulating jig, in order to equalize the pressure in the space enclosed by the tube melt extruded through a circular die and the inner diameter-regulating jig with the pressure in the space into which air is introduced through air pipe 1. One or more air pipes 2 may be provided.

The above configuration is preferable, because the molten tube maintaining its uniform shape can be brought into contact with the inner diameter-regulating jig, and thereby, the inner surface shape of the tube-shaped resin can be more appropriately maintained. Additionally, the above configuration is preferable, because the position at which the molten tube contacts the inner diameter-regulating jig can be controlled constantly, and disturbance of the resin orientation can also be minimized.

Thereafter, the tube-shaped resin, which is moved on to the outer diameter-regulating jig, is brought into intimate contact with the inner surface of the outer diameter-regulating jig due to the air pressure applied through a pipe hole (air pipe 1) located at the center of the support bar of the inner diameter-regulating jig, so as to be cooled. Thereby, a perfect round tube having uniform thickness precision and a low degree of orientation can be obtained. The tube-shaped resin is rolled onto a roller, while maintaining its shape, after contacting the two diameter-regulating jigs.

As described above, by the formation of a tube-shaped fluororesin with the use of both inner and outer diameter-regulating jigs and with the application of an internal pressure by introducing air, the thus-produced tube will not undergo deflection due to its own weight even if it has a large diameter, and the tube will be prevented from irregularly contacting the cooling point, i.e., the regulation jigs.

Additionally, the provision of a cylindrical protector (an orientation control cover) with a metal mold can reduce the effect of the disturbance applied to the tube prior to its contact with the inner diameter-regulating jig; further, the cylindrical protector can maintain the tube temperature. Thereby, a tube having an excellent thickness precision (particularly, thickness precision in the circumferential direction) and a low degree of orientation can be produced.

The produced tube is folded in halves by a take-up roller and is wound on a take-up core. The take-up roller may be adjusted to have a roller width narrower than the width of the tube folded in halves so that each of the tube sides is not squeezed (pinched). Thereby, a high-quality tube having no folds can be produced.

The fluororesin tube of the present invention may preferably be used as a surface release layer of a belt for an image forming apparatus employing an electrophotographic system. Examples of such release layers include a surface layer of a developing sleeve of a developing unit, which develops toner on an electrostatic latent image formed on a photoconductor; a surface layer of an intermediate transfer belt used for transferring the developed toner image onto a recording material such as a paper etc.; a surface layer of a fixing belt that fixes the transferred toner image on the recording material; a surface layer of a transfer-fixing belt used for both the transferring and the fixing; and the like.

Advantageous Effects of Invention

The fluororesin tube of the present invention has, even with an average outer diameter of ø 100 mm or more, excellent wall thickness precision and a low degree of orientation. Since the above fluororesin tube is excellent in wall thickness precision, variation in wall thickness is sufficiently small. Therefore, when the above fluororesin tube is used as a belt surface release layer, satisfactory image formation can be performed due to uniform thermal conductivity etc. The above fluororesin tube has a degree of orientation as low as 0.55 or less; therefore, the occurrence of cracking or tearing of the tube during the formation or actual use after the formation of a fuser roller or a belt can be minimized.

Accordingly, the fluororesin tube of the present invention is preferably used as a surface release layer of a belt for an image forming apparatus employing an electrophotographic system.

DESCRIPTION OF EMBODIMENTS

Hereinafter, the present invention is described in more detail with reference to Examples. However, the present invention is not limited thereto.

The produced fluororesin tube was evaluated as follows.

Tube Thickness

Figure 3:
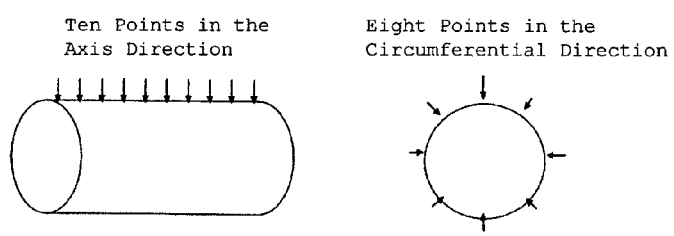
FIG. 3 shows measurement points (80 points in total) of fluororesin tube thickness.

An average tube wall thickness is expressed as an average value of the thicknesses at 80 measurement points in total, in which 10 points are determined at equal intervals along the central axis direction of the tube that was cut to a specified length of 600 mm, and based on the 10 points, 8 points each are respectively determined at equal intervals along the circumferential direction (see FIG. 3). A micrometer, product of Mitutoyo Corporation, was used to measure the wall thicknesses Degree of Orientation (F)

With respect to a tube that was cut to a specified length of 600 mm, four sample pieces (axis direction×circumferential direction: 2×1 cm) are cut out from certain places determined at equal intervals along the circumferential direction from a point arbitrarily determined along the central axis direction. The four sample pieces are measured with respect to the diffraction intensity distribution for azimuthal angles of the fluororesin crystal peak. The average of the measured values is expressed as the degree of orientation. The device and conditions utilized to measure the degree of orientation are as follows.

Device: product of Rigaku Corporation, RINT2550
Accessory Device: Fiber Sample Table
X-Ray Source: CuK α
Output: 40 kV, 370 mA
Detector: Scintillation Counter Each of the four sample pieces (2×1 cm) is directly fixed on a holder and is measured in the through view. The axis direction (the MD direction) of each sample is referenced as a standard axis, and the diffraction intensity distribution for azimuthal angles of the fluororesin crystal peak (around $2\theta=18°$) are measured. The degree of orientation is calculated using the following formula.

$$F=(180-\alpha)/180$$

wherein α is a half width of the orientation peak.

EXAMPLE 1

As described below, a PFA tube having an outer diameter of 150 mm and an average thickness of 29 μm was produced by subjecting a PFA (MFR=2.1 g/10 min) having a melting point of 310° C. to melt extrusion through a circular die.

Figure 1:
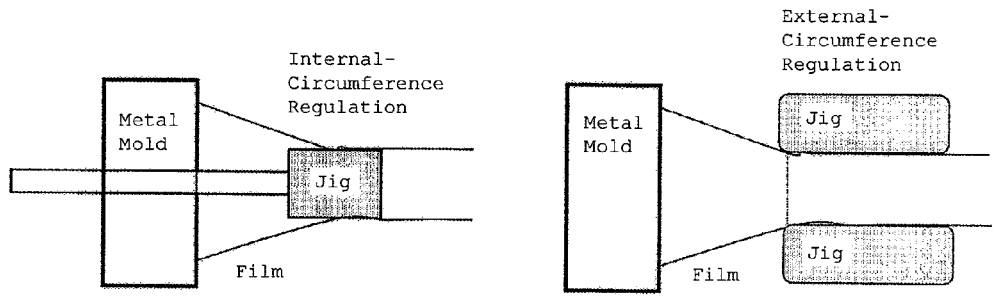
FIG. 1 shows an example of fluororesin tube formation according to a known process.
Figure 2:
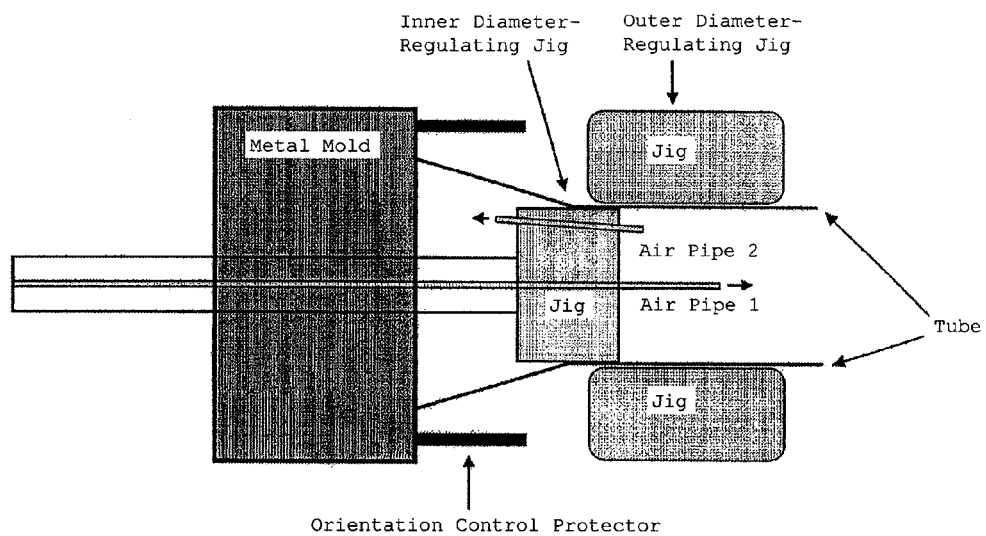
FIG. 2 shows an example of fluororesin tube formation according to the present invention.

Two types of diameter-regulating jigs were provided so as to cool and solidify a resin melt extruded through a circular die, and to regulate the tube diameters to specific values. Additionally, a cylindrical metal protector was provided for enclosing the tube to an area where the tube was brought into contact with the jig. See FIG. 2.

First, the inner surface of the extruded tube was arranged to be brought into contact with a first cooling and diameter-regulating jig. Inside the jig, cooling water was flowing (circulating). Provided in the middle of a support bar of the jig was a pipe hole, through which air could be introduced. Air at room temperature was introduced through the pipe hole to apply an internal pressure so as to prevent the tube from sagging after contacting the inner diameter-regulating jig.

Further, another cooling and diameter-regulating jig, which contacts the outer surface of the tube, was preliminarily provided. Immediately after the inner surface of the tube was brought into contact with the inner diameter-regulating jig, the outer surface of the tube was brought into contact with another cooling and diameter-regulating jig above. The produced tube was folded in halves by a pinch roller and was wound on a core.

The average thickness of the obtained tube was 29 μm. The tube thicknesses measured at each of the 80 points were all within the range of ±10.3% with respect to the average thickness of the tube. The degree of orientation (F) of the tube was 0.34.

EXAMPLE 2

A PFA tube was produced in the same manner as in Example 1, except that the PFA tube had an outer diameter of 165 mm and a thickness of 33 μm.

The average thickness of the obtained tube was 33 μm. The tube thicknesses measured at each of the 80 points were all within the range of ±9.1% with respect to the average thickness of the tube. The degree of orientation (F) of the tube was 0.50.

COMPARATIVE EXAMPLE 1

A tube was produced in the same manner as in Example 1, except that the application of pressure inside the tube by the introduction of air was not carried out.

The average thickness of the obtained tube was 32 μm. The tube thicknesses measured at each of the 80 points were all within the range of ±25.0% with respect to the average thickness of the tube. The degree of orientation (F) of the tube was 0.58.

COMPARATIVE EXAMPLE 2

A tube was produced in the same manner as in Example 1, except that the cylindrical metal protector was removed and that the outer surface of the tube was not brought into contact with the cooling and diameter-regulating jig.

The average thickness of the obtained tube was 30 μm. The tube thicknesses measured at each of the 80 points were all within the range of ±26.7% with respect to the average thickness of the tube. The degree of orientation (F) of the tube was 0.65.

The invention claimed is:

1. A fluororesin tube having an average thickness of 70 μm or less and an outer diameter of 100 mm or more, wherein variation in the tube thickness is within ±20% of the average tube thickness, and a degree of orientation (F) is within a range of 0.25 to 0.55.

2. The fluororesin tube according to claim 1, wherein the fluororesin is at least one member selected from the group consisting of PFA, FEP, ETFE and a mixture thereof.

3. The fluororesin tube according to claim 1, having no folds.

4. A process for producing a fluororesin tube, comprising:
    subjecting a fluororesin to melt extrusion to produce a tube-shaped fluororesin; and
    bringing both outer and inner surfaces of the tube-shaped fluororesin separately into contact with outer and inner diameter-regulating jigs while applying an internal pressure to inside the tube-shaped fluororesin, so as to maintain its tube shape so as to produce a fluororesin tube having an average thickness of 70 μm or less and an outer diameter of 100 mm or more, wherein variation in the tube thickness is within ±20% of the average tube thickness, and a degree of orientation (F) is within a range of 0.25 to 0.55.

5. The process for producing a fluororesin tube according to claim 4,
    wherein the inner surface of the tube-shaped fluororesin is brought into contact with the inner diameter-regulating jig, and subsequently the outer surface of the tube-shaped fluororesin is brought into contact with the outer diameter-regulating jig.

6. The process for producing a fluororesin tube according to claim 5,
wherein a cylindrical protector provided with a metal mold encloses the outer periphery of the tube-shaped fluororesin to an area where the tube-shaped fluororesin is brought into contact with the inner diameter-regulating jig.

7. A surface release layer of a belt for an image forming apparatus employing an electrophotographic system, comprising a fluororesin tube of claim 1.

8. The fluororesin tube according to claim 2, having no folds.

9. A surface release layer of a belt for an image forming apparatus employing an electrophotographic system, comprising a fluororesin tube of claim 2.

10. A surface release layer of a belt for an image forming apparatus employing an electrophotographic system, comprising a fluororesin tube of claim 3.

* * * * *